United States Patent
Noritake

(10) Patent No.: US 12,287,091 B2
(45) Date of Patent: Apr. 29, 2025

(54) FAN APPARATUS

(71) Applicant: Rinnai Corporation, Aichi (JP)

(72) Inventor: Katsuya Noritake, Aichi (JP)

(73) Assignee: RINNAI CORPORATION, Aichi (JP)

( * ) Notice: Subject to any disclaimer, the term of this patent is extended or adjusted under 35 U.S.C. 154(b) by 438 days.

(21) Appl. No.: 18/054,668

(22) Filed: Nov. 11, 2022

(65) Prior Publication Data

US 2023/0175693 A1 Jun. 8, 2023

(30) Foreign Application Priority Data

Dec. 7, 2021 (JP) .................................. 2021-198435

(51) Int. Cl.
*F23N 3/00* (2006.01)
*F23D 14/02* (2006.01)

(52) U.S. Cl.
CPC .............. *F23N 3/005* (2013.01); *F23D 14/02* (2013.01)

(58) Field of Classification Search
CPC . F23N 3/005; F23N 5/24; F23N 5/242; F23N 5/245; F23N 5/247; F23N 2233/08; F23D 14/02
USPC .......................................................... 431/18
See application file for complete search history.

(56) References Cited

FOREIGN PATENT DOCUMENTS

| CN | 108826700 A | * | 11/2018 | ........... F24H 9/2035 |
| JP | 3029547 B2 | | 4/2000 | |
| JP | 2021025722 A | | 2/2021 | |
| WO | WO-2019091619 A1 | * | 5/2019 | ............. F23N 3/002 |

* cited by examiner

*Primary Examiner* — Vivek K Shirsat
(74) *Attorney, Agent, or Firm* — Future IP LLC; Tomoko Nakajima

(57) ABSTRACT

In a fan apparatus that includes a passage, a switching device, and a control device, on a premise that at a state where an effective sectional area at a predetermined portion of the passage is switched to a predetermined first-area by the switching device, a value of a current flowing to the fan when a rotational speed of the fan is made to a predetermined rotational speed is defined as a first fan-current value, at a state where the effective sectional area at the predetermined portion of the passage is switched to a predetermined second-area which is larger than that of the first area by the switching device, the value of the current flowing to the fan when the rotational speed of the fan is made to the predetermined rotational speed is defined as a second fan-current value, and a ratio of the first fan-current value to the second fan-current value is defined as a detected current ratio, a control device is configured to: memorize as a standard current ratio a detected current ratio that is detected when the fan apparatus is set up; and decide a clogging degree of the passage by comparison of a detected current ratio after detection of the standard current ratio with the standard current ratio.

2 Claims, 4 Drawing Sheets

FAN APPARATUS

TECHNICAL FIELD

The invention relates to a fan apparatus that includes a passage in which a fan is interposed, a switching device that switches an effective sectional area at a predetermined portion of the passage, and a control device.

BACKGROUND ART

There has been conventionally known one of combustion apparatuses including the above-identified fan apparatus, with which a burner, the passage that includes: an intake passage on an upstream side of the burner; a combustion chamber in which an air-fuel gas that ejects from the burner combusts; and an exhaust passage on a downstream side of the combustion chamber, the fan that is interposed in the intake passage, a gas supply passage of which a downstream end is connected to a gas suction part that is disposed in a portion, on an upstream side of the fan, of the intake passage, and a zero governor that is interposed in the gas supply passage and regulates a secondary gas pressure to an atmospheric pressure (See patent document No. 1, for example).

Here, a supply amount of a fuel gas through the gas supply passage varies depending on a differential pressure between the atmospheric pressure that is the secondary gas pressure and a negative pressure that acts upon the gas suction part. The negative pressure that acts upon the gas suction part varies corresponding to a rotational speed of the fan. Therefore, the supply amount of the fuel gas varies in proportion to the rotational speed of the fan, i.e., a supply amount of air. Accordingly, by controlling the rotational speed of the fan corresponding to a required combustion amount, the air-fuel mixture (a mixed gas of the fuel gas with a primary air) in an amount corresponding to the required combustion amount is supplied to the burner through the intake passage, and an excess air ratio of the air-fuel mixture (a primary air amount/a theoretical air amount) becomes constant.

Additionally, with the above-mentioned conventional combustion apparatus, a butterfly valve as a switching device that switches an effective sectional area at a predetermined portion of the intake passage is provided and, by switching the effective sectional area using the butterfly valve, the conventional combustion apparatus is configured to carry out a control so that a combustion capacity is switched to at least two stages of which one is large and the other is small. That is, in a case where the required combustion amount is relatively small, by switching the butterfly valve to a closed posture that causes the effective sectional area at the predetermined portion of the intake passage to become small, the combustion capacity is switched to such a small capacity as the air-fuel mixture of an amount corresponding to the relatively-small required combustion amount is supplied to the burner. Further, in a case where the required combustion amount is relatively large, by switching the butterfly valve to an opened posture that causes the effective sectional area at the predetermined portion of the intake passage to become large, the combustion capacity is switched to such a large capacity as the air-fuel mixture in an amount corresponding to the relatively-large required combustion amount is supplied to the burner.

Additionally, regarding fan apparatus with which the fan that is interposed in the passage is provided, there has conventionally known a fan apparatus that is configured to: detect a value of a current (a fan-current value) flowing to the fan (exactly, a drive motor of the fan); and decide a clogging degree of the passage by comparison of a detected fan-current value with a standard fan-current value corresponding to the rotational speed of the fan. See patent document No. 2, for example.

On the other hand, as air density changes accompanied by a change of the atmospheric pressure, temperature, or both, the fan-current value also changes. Therefore, the above-mentioned conventional fan apparatus that is configured to decide the clogging degree of the passage by comparison of the detected fan-current value with the standard fan-current value sometimes decide the clogging degree erroneously with an influence(s) of the atmospheric pressure, temperature, or both.

REFERENCE

Patent document No. 1: JPA 2021-025722
Patent document No. 2: JPA 1996-261455

SUMMARY OF INVENTION

Technical Problem

In the light of the above-mentioned problem, in the fan apparatus that includes the passage in which the fan is interposed and the switching device that switches the effective sectional area at the predetermined portion of the passage, the invention aims to be able to exactly decide the clogging degree of the passage without any influence of the atmospheric pressure, temperature, or both.

Solution to Problem

In order to solve the above-mentioned problem, the invention presupposes a fan apparatus that includes a passage in which a fan is interposed, a switching device that switches an effective sectional area at a predetermined portion of the passage, and a control device. In the invention, on a premise that at a state where the effective sectional area at the predetermined portion of the passage is switched to a predetermined first-area by the switching device, a value of a current flowing to the fan when a rotational speed of the fan is made to a predetermined rotational speed is defined as a first fan-current value, at a state where the effective sectional area at the predetermined portion of the passage is switched to a predetermined second-area which is larger than that of the first-area by the switching device, the value of the current flowing to the fan when the rotational speed of the fan is made to the predetermined rotational speed is defined as a second fan-current value, and a ratio of the first fan-current value to the second fan-current value is defined as a detected current ratio, the control device is configured to: memorize as a standard current ratio a detected current ratio that is detected when the fan apparatus is set up; and decides a clogging degree of the passage by comparison of the detected current ratio after detection of the standard current ratio with the standard current ratio.

Here, though each of values of the first-current and the second-current is influenced by an atmospheric pressure, temperature, or both, by dividing the first fan-current value that is influenced by the atmospheric pressure, temperature, or both by the second fan-current value that is similarly influenced by the atmospheric pressure, temperature, or both, the detected current ratio becomes a value without any influence of the atmospheric pressure, temperature, or both. Then, according to the invention, by comparing the standard current value that is detected current value, which is detected when the fan apparatus is set up, i.e., at a state where any clogging of the passage does not occur, with the detected current ratio after detection of the standard current ratio, an exact evaluation of a clogging degree of the passage can be carried out without any influence of the atmospheric pressure, or temperature, or both.

As described below in detail, in a case where the clogging at the above-mentioned predetermined portion (at the portion in which the switching device is disposed) of the passage occurs, since the second fan-current value little changes but the first fan-current value decreases, the detected current ratio decreases. Additionally, in a case where the clogging at a portion, except the predetermined portion, of the passage occurs, since the first fan-current value little changes but the second fan-current passage value decreases, the detected current ratio increases. Accordingly, when the detected current ratio decreases below the standard current ratio, it can be decided that the clogging degree at the predetermined portion of the passage increases and when the detected current value increases above the standard current ratio, it can be decided that the clogging degree at the portion, except the predetermined portion, of the passage increases.

DESCRIPTION OF EMBODIMENTS

Figure 1:
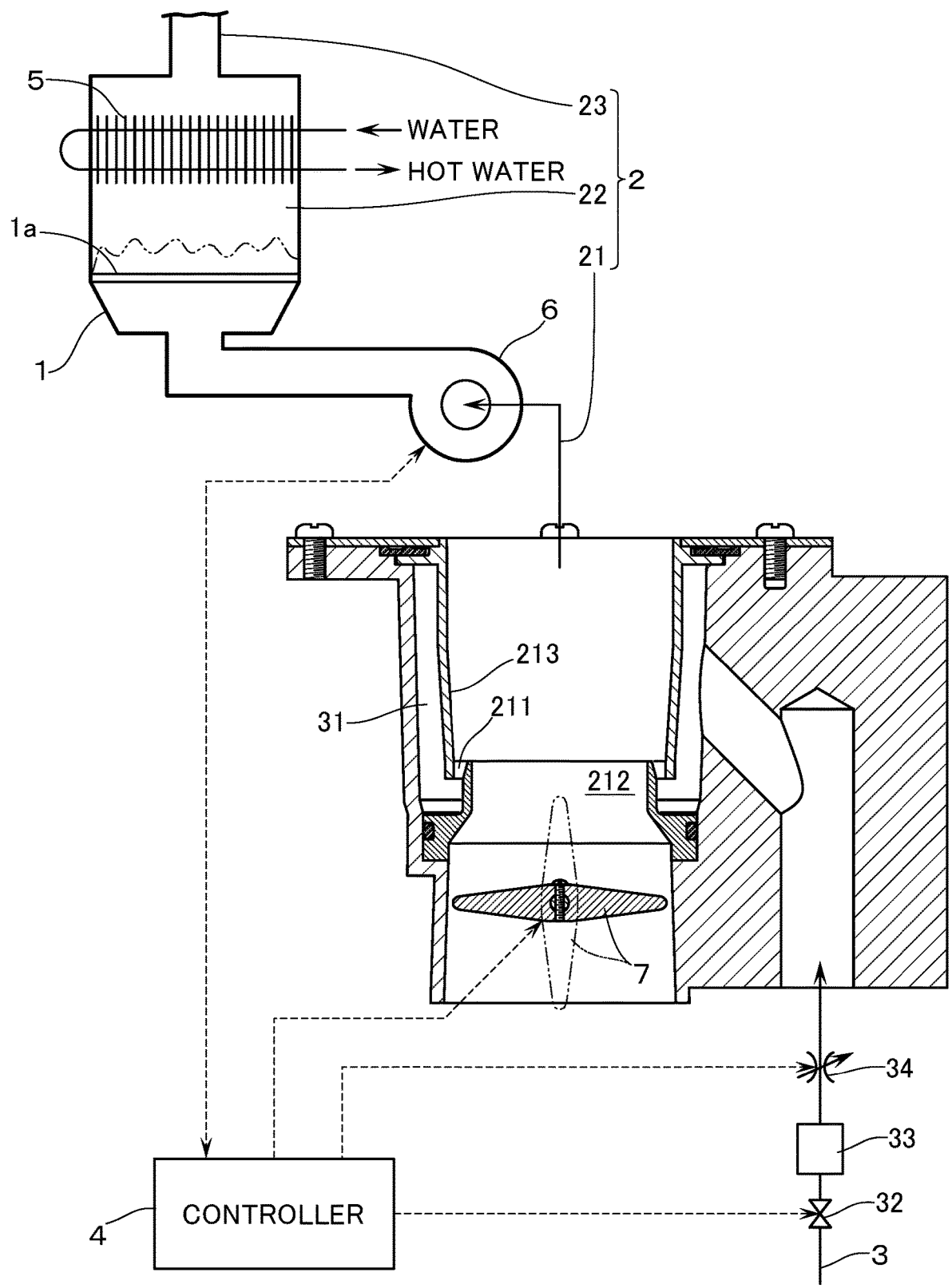
FIG. 1 is an explanation diagram that shows a combustion apparatus which includes a fan apparatus of an embodiment according to the invention.

A combustion apparatus that is shown in FIG. 1, with which a fan apparatus of an embodiment according to the invention is provided, includes a totally aerated combustion burner 1, a passage 2 that carries out supply of an air-fuel mixture to and exhaust of a combustion gas from the burner 1, a gas supply passage 3 that supplies a fuel gas, a controller 4 as a control device. The passage 2 is constituted by an intake passage 21 on an upstream side of the burner 1, a combustion chamber 22 in which the air-fuel mixture that ejects from a combustion surface 1a of the burner 1 combusts, and an exhaust passage 23 on a downstream side of the combustion chamber 22. In the combustion chamber 22, a heat exchanger 5 for delivering hot water is disposed. Additionally, in the intake passage 21, a fan 6 that is controlled by the controller 4 is interposed.

A downstream end of the gas supply passage 3 is connected to a gas suction part 211 that is provided with a portion of the intake passage 21, which is positioned at an upstream side of the fan 6. Then, the air-fuel mixture can be generated by being mixed the fuel gas that is sucked at the gas suction part 211 with air that is supplied through portion, on an upstream side, of the gas suction part 211 and the air-fuel mixture can be supplied to the burner 1 through a portion, on a downstream side of the gas suction part 211, of the intake passage 21.

In a portion of the intake passage 21, which is adjacent to the upstream side of the gas suction part 211, a venturi part 212 with a diameter smaller than that of a portion, in which a below-mentioned butterfly valve 7 is disposed, is arranged. A portion of the intake passage 21, which is adjacent to a downstream side of the venturi part 212 is enclosed by a tubular part 213 with a diameter larger than that of the venturi part 212. Then, a downstream end portion of the venturi part 212 is inserted into an upper end portion of the tubular part 213 while leaving an annular clearance and the gas suction part 211 is constituted by the clearance. At the downstream end of the gas supply passage 3, in a manner to enclose the tubular part 213, a gas chamber 31 that communicates with the gas suction part 211 is provided. Additionally, at the gas supply passage 3, from an upstream side downward in sequence, a main valve 32 that is controlled by the controller 4, a zero governor 33 that regulates a secondary gas pressure to an atmospheric pressure, and a variable throttle valve 34 that is controlled by the controller 4 are arranged.

An amount of the fuel gas supplied through the gas suction part 211 varies depending on a differential pressure between the secondary gas pressure and a negative pressure that acts upon the gas suction part 211. Here, the negative pressure that acts upon the gas suction part 211 varies corresponding to a rotational speed of the fan 6 (hereinafter referred to a fan rotational speed). Additionally, a ratio of a supply amount of the fuel gas to a supply amount of the air varies by an opening degree of the variable throttle valve 34. By setting the opening degree of the variable throttle valve 34 at a predetermined standard opening-degree according to a kind of a gas to be used, an air excess ratio of the air-fuel mixture becomes a predetermined appropriate value (e.g., 1.3). Then, by controlling the fan rotational speed corresponding to a required combustion amount (a combustion amount necessary for delivering hot water at a set temperature), the air-fuel mixture with the appropriate value of the air excess ratio and in an amount corresponding to the required combustion amount can be supplied to the burner 1.

On the other hand, in order to suppress poor combustion due to entry of wind into the exhaust passage 23, that is, in order to secure a wind-resistant performance, a lower-limit rotational speed of the fan 6 cannot to be set considerably low. Further, in a case where the required combustion amount decreases to the predetermined amount corresponding to the lower-limit rotational speed of the fan 6, or smaller, air in amount corresponding to the required combustion amount cannot be supplied. Then, in a predetermined portion of the passage 2, e.g., in a portion, on the upstream side of the gas suction part 211, of the intake passage 21 in the embodiment, as a switching device that switches an effective sectional area at the portion in question, a butterfly valve 7 that is controlled by the controller 4 is disposed. In the embodiment, in a case where the required combustion amount decreases to the above-mentioned predetermined amount or smaller, the butterfly valve 7 is switched to a closed posture, as illustrated in a solid line in FIG. 1, at which the effective sectional area at the portion in which the butterfly valve 7 is disposed becomes a predetermined first-area that is set to be small and without reducing the fan rotational speed to the lower-limit of the fan rotational speed or slower, air in the amount corresponding to the required combustion amount that is a predetermined amount or smaller can be supplied.

Provided that only the butterfly valve 7 is switching to the closed posture, the negative pressure that acts upon the gas suction part 211 increases, the supply amount of the fuel gas will become excessive, and as a result, the air excess ratio of the air-fuel mixture that is supplied to the burner 1 will decrease below the appropriate value. Then, in a case where the required combustion amount is relatively small, a combustion capacity is changed to a small-capacity not only by switching the butterfly valve 7 to the closed posture but also by changing the opening degree of the variable throttle valve 34 to smaller than the standard opening-degree, the air-fuel mixture with the appropriate value of the air excess ratio and in the amount corresponding to a relatively-small required combustion amount can be configured to supplied to the burner 1. Additionally, in a case where the required combustion amount is relatively large, the combustion capacity is changed to a large-capacity not only by switching the butterfly valve 7 to an opened posture, as illustrated in an imaginary line in FIG. 1, at which the effective sectional area of the portion in which the butterfly valve 7 is disposed becomes a predetermined second-area but also by changing the opening degree of the variable throttle valve 34 to the standard opening-degree, the air-fuel mixture with the appropriate value of the air excess ratio and in amount corresponding to a relatively-large required combustion can be supplied to the burner 1.

Incidentally, in a case where contaminations accumulate on an inner surface(s) at any of the portions of the passage 2 and a clogging degree of that portion becomes some limit or larger, it is desirable that the combustion apparatus will be suspended by distinction of abnormality (erroneous suspension). Here, in general, by detecting a value of a current flowing to the fan 6 (fan-current value) and comparing a detected fan-current value with a standard fan-current value corresponding to the fan rotational speed, the clogging degree of the passage 2 can be decided. However, as air density changes due to a change of an atmospheric pressure, temperature, or both, the fan-current value also changes. As a result, in the case where the clogging degree of the passage 2 is decided by comparison of the detected fan-current value with the standard fan-current value, the clogging degree is sometimes decided erroneously with any influence of the atmospheric pressure, temperature, or both.

Figure 2:
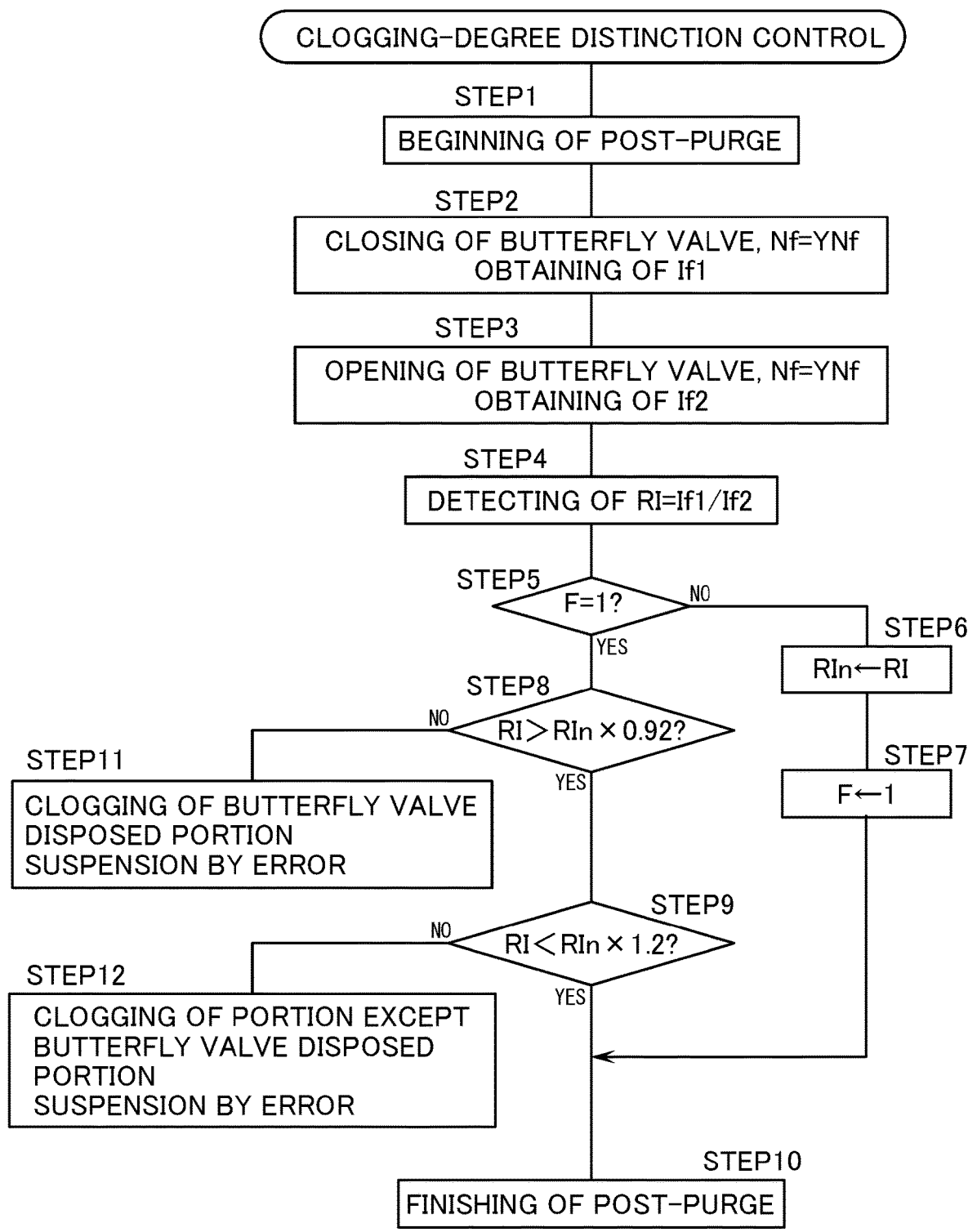
FIG. 2 is flow diagram that shows contents of a clogging-degree distinction control which a controller that is provided with the fan apparatus of the embodiment carries out.

Then, in the embodiment, the controller 4 is configured to carry out to a clogging-degree distinction control as shown in FIG. 2. In the following explanation, at the state where the butterfly valve 7 is switched to the closed posture and when the fan rotational speed Nf is made to a predetermined rotational speed (for example, 4,500 rpm) YNf, the fan-current value is defined to be a first fan-current value If1. Also, at the state where the butterfly valve 7 is switched to the opened posture and when the fan rotational speed is made to the above-mentioned predetermined rotational speed, the fan-current value is defined to be a second fan-current value If2. Further, a ratio of the first fan-current value If1 to the second fan-current value If2 (If1/If2) is defined to be a detected current ratio RI.

The clogging-degree distinction control is carried out during a post-purge after combustion is suspended by closing the master valve 32. In STEP 1, the post-purge has been begun and subsequently, in STEP 2, the butterfly valve 7 is switched to the closed posture and, in addition, the fan rotational speed Nf is made to the predetermined rotational speed YNf, the first fan-current value If1 is obtained. Next, in STEP 3, the butterfly valve 7 is switched to the opened posture and, in addition, the fan rotational speed Nf is made to the predetermined rotational speed YNf, the second fan-current value If2 is obtained. After those, in STEP 4, the detected current ratio RI is calculated (detected) by dividing the first fan-current value If1 that has been obtained in STEP 2 by the second fan-current value If2 that has been obtained in STEP 3.

Next, in STEP 5, a distinction whether a flag F that has been set an initial value to "0" is set to "1" is carried out. When the post-purge is first carried out during a trial operation when the combustion apparatus is set up, since the flag F is "0", "NO" is distinguished in STEP 5 and, in STEP 6, the detected current ratio RI that has been detected in STEP 4 is memorized as a standard current ratio RIn. Subsequently, in STEP 7, the flag F is set to "1", and in STEP 10, the post-purge is finished by stopping the fan 6.

When the post-purge is carried out during operations after the trial operation of the combustion apparatus, "YES" is distinguished in STEP 5 via STEPs 1-4. Then, in and after STEP 8, the clogging degree of the passage 2 is decided by comparison of the detected current ratio RI that has been detected in STEP 4 at this time with the standard current ratio RIn. Specifically, in STEP 8, whether the detected current ratio RI in STEP 4 at this time is larger than a value of 92% of the standard current ratio RIn is distinguished. In a case of RI>RIn×0.92, in STEP 9, whether the detected current ratio RI in STEP 4 at this time is smaller than a value of 120% of the standard current ratio Rin is distinguished. Then, in a case of RI≤RIn×1.2, in STEP 10, the post-purge is finished. On the other hand, in a case of RI≤RIn×0.92, in STEP 11 from STEP 8, it is decided that the clogging degree at the portion of the passage 2, in which the butterfly valve 7 is disposed, increases to a level of combustion deterioration, and display to that effect and an erroneous suspension that prohibits operations of the combustion apparatus thereafter are carried out. Additionally, in a case of RI>RIn×1.2, in STEP 12 from STEP 9, it is decided that the clogging degree at a portion, except the portion in which the butterfly valve 7 is disposed, of the passage 2 increases to the level of combustion deterioration, and display to that effect and the erroneous suspension that prohibits operations of the combustion apparatus thereafter are carried out.

Here, though each of values If1, If2 of the first fan-current and the second fan-current is influenced by the atmospheric pressure, temperature, or both, the detected current ratio RI becomes a value without any influence of the atmospheric pressure, temperature, or both by dividing the first fan-current value If1 that is influenced by the atmospheric pressure, temperature, or both by the second fan-current value If2 that is similarly influenced by the atmospheric pressure, temperature, or both. Additionally, in the embodiment, by the comparison of the standard current ratio RIn, which is the detected current ratio RI when the combustion apparatus is set up, i.e., at a state where any clogging of the passage 2 does not occur, with the detected current ratio RI that is detected after detection of the standard current ratio RIn, the clogging degree of the passage 2 can be exactly decided without any influence of the atmospheric pressure, temperature, or both.

Figure 3A:
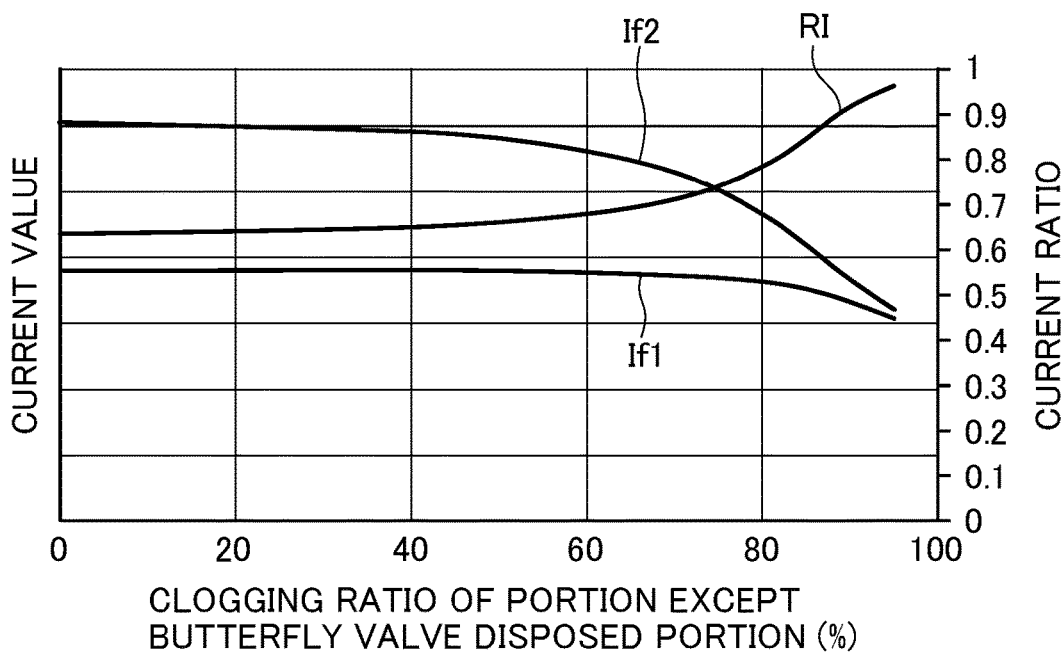
FIG. 3A is a graph that shows changes of each of values of a first fan-current and a second fan-current and a detected current ratio by a change of a clogging ratio at a portion except a portion in which a butterfly valve is disposed.
Figure 3B:
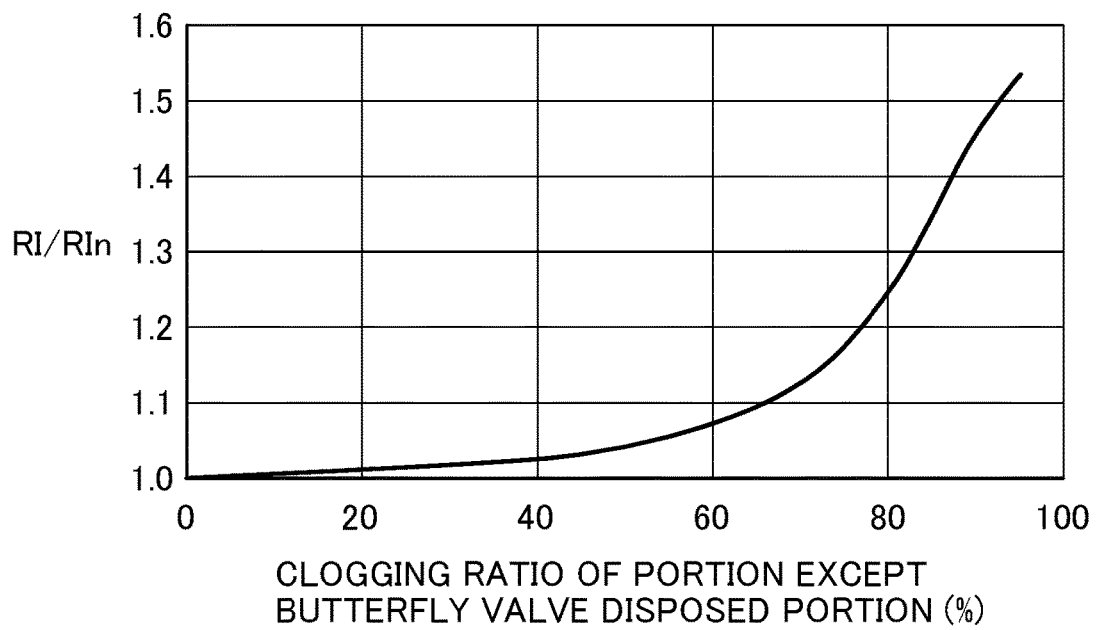
FIG. 3B is a graph that shows changes of a detected current ratio to a standard current ratio by the change of the clogging ratio at the portion except the portion in which the butterfly valve is disposed.

Further, in the case where the clogging by adhesion of the contaminants to the inner surface(s) occurs at the portion, except the portion in which the butterfly valve 7 is disposed, of the passage 2, as long as the clogging ratio becomes considerably large, the effective sectional area of a clogged portion is larger than that of the portion in which the butterfly valve 7 that is switched to the closed posture is disposed. Therefore, as shown in FIG. 3A, accompanied by the increase of the clogging ratio at the portion except the portion in which the butterfly valve 7 is disposed, though the second fan-current value If2 decreases to a relatively large level, the first fan-current value If1 little decreases, and as a result, the detected current ratio RI increases accompanied by the increase of the clogging ratio. Then, the ratio (=RI/RIn) of the detected current ratio RI to the standard RIn changes, as shown in FIG. 3B, by a change of the clogging ratio at the portion except the portion in which the butterfly valve 7 is disposed. When the clogging ratio at the portion except the portion in which the butterfly valve 7 is disposed becomes a value of 80% or larger, a combustion performance is deteriorated. Then, as above-mentioned, in the case of RI≥RIn×1.2, the clogging degree at the portion except the portion in which the butterfly valve 7 is disposed is decided to increase to a level of combustion deterioration and the erroneous suspension is carried out.

Figure 4A:
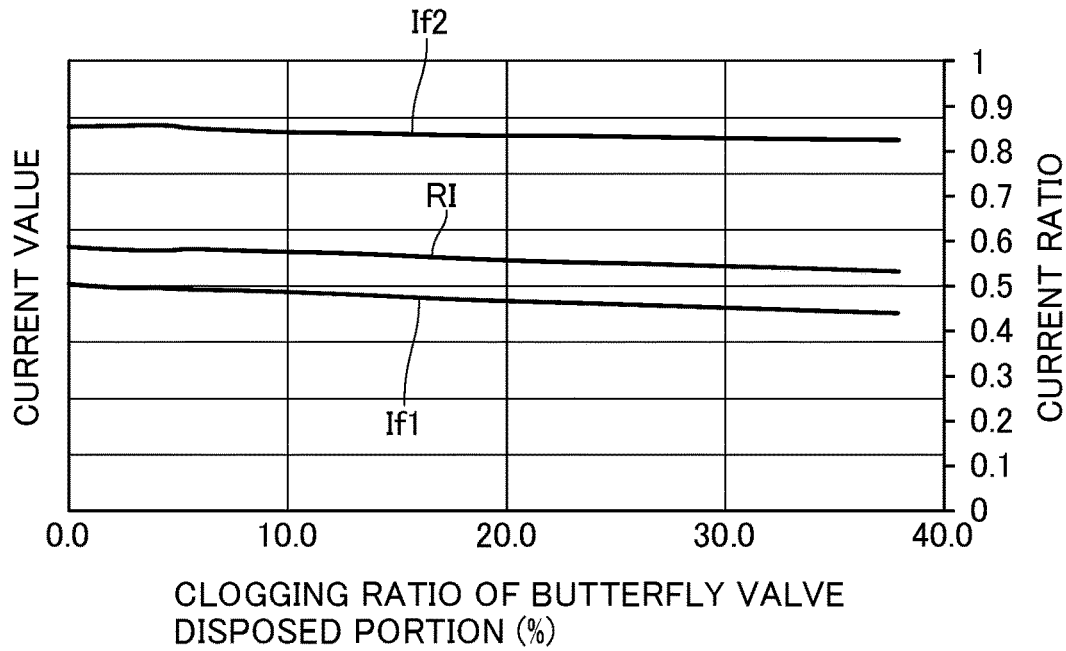
FIG. 4A is a graph that shows changes of each of the values of first-fan current and the second fan-current and the detected current ratio by the change of the clogging ratio at the portion in which a butterfly valve is disposed.
Figure 4B:
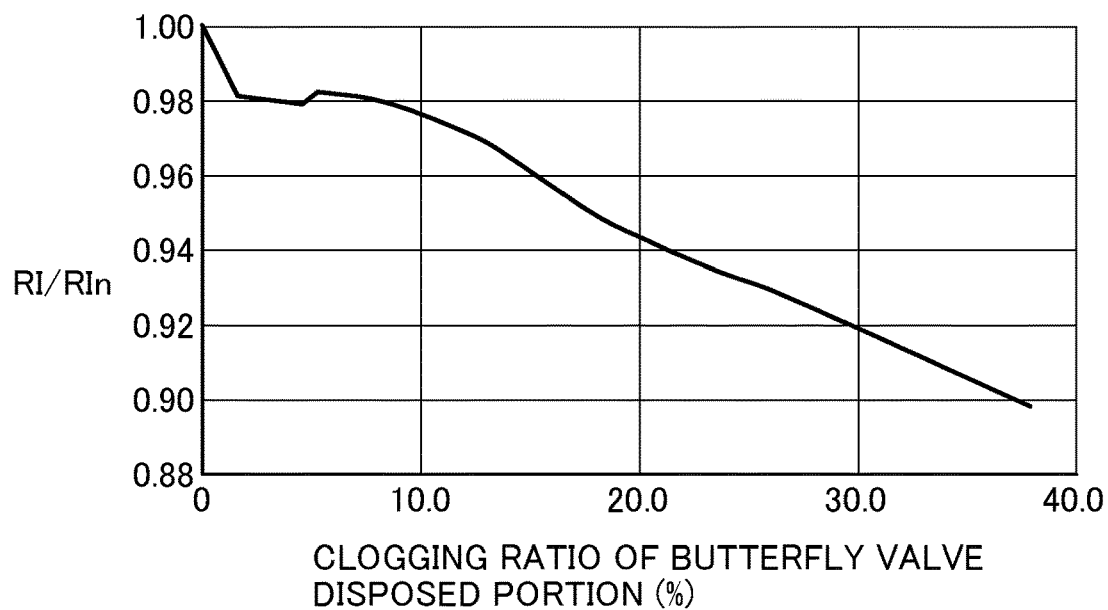
FIG. 4B is a graph that shows changes of the detected current ratio to the standard current ratio by the change of the clogging ratio at the portion in which the butterfly valve is disposed.

Additionally, in the case where clogging by adhesion of contaminants to the inner surface(s) at the portion, in which the butterfly valve 7 is disposed, of the passage 2 occurs, as shown in FIG. 4A, though the first fan-current value If1 decreases accompanied by the clogging ratio at the portion in which the butterfly valve 7 is disposed, the second fan-current value If2 remains almost constant without any influence of the clogging at the portion in which the butterfly valve 7 is disposed, and as a result, the detected current ratio RI decreases accompanied by an increase of the clogging ratio. Then, the ratio (=RI/RIn) changes as shown in FIG. 4B by a change of the clogging ratio at the portion in which the butterfly valve 7 is disposed. When the clogging ratio at the portion in which the butterfly valve 7 is disposed becomes a value of 30% or larger, the combustion performance is deteriorated. Then, as above-mentioned, in the case of RI<RIn×0.92, the clogging degree at the portion in which the butterfly valve 7 is disposed is decided to increase to the level of the combustion deterioration and the erroneous suspension is carried out. If the clogged portion can thus be specified, maintenance operations will be facilitated.

The embodiment of the invention is explained referring to figures in the above. On the other hand, the invention is not restricted to the above-mentioned embodiment. For example, it is possible to correct the fan rotational speed corresponding to the clogging ratio obtained by a ratio of the detected current ratio RI to the standard current ratio RIn. Additionally, it is also possible that the switching device that switches the effective sectional area of the predetermined portion of the passage 2 is constituted by other devices than the butterfly valve 7 in the above-mentioned embodiment. Further, in the embodiment, though the invention is applied to the fan apparatus for the combustion apparatus, the invention is able to be similarly applied to a fan apparatus in use except the combustion apparatus.

EXPLANATION OF SYMBOLS

2 Passage
4 Controller (Control device)
6 Fan
7 Butterfly valve (Switching device)

What is claimed is:

1. A fan apparatus, comprising,
a passage in which a fan is interposed;
a switching device that switches an effective sectional area at a predetermined portion of the passage; and
a control device,
wherein:
on a premise that at a state where the effective sectional area at the predetermined portion of the passage is switched to a predetermined first-area by the switching device, a value of a current flowing to the fan when a rotational speed of the fan is made to a predetermined rotational speed is defined as a first fan-current value, at a state where the effective sectional area of the predetermined portion of the passage is switched to a predetermined second-area which is larger than that of the first-area by the switching device, the value of the current flowing to the fan when the rotational speed of the fan is made to the predetermined rotational speed is defined as a second fan-current value, and a ratio of the first fan-current value to the second fan-current value is defined as a detected current ratio,
the control device is configured to: memorize as a standard current ratio a detected current ratio that is detected when the fan apparatus is set up; and decide a clogging degree of the passage by comparison of a detected current ratio after detection of the standard current ratio with the standard current ratio.

2. The fan apparatus as claimed in claim 1, wherein when the detected current ratio decreases below the standard current ratio, the control device decides that the clogging degree at the predetermined portion of the passage increases and when the detected current ratio increases above the standard current ratio, the control device decides that the clogging degree at a portion, except the predetermined portion, of the passage increases.

* * * * *